United States Patent
Watson

(10) Patent No.: US 10,354,061 B2
(45) Date of Patent: Jul. 16, 2019

(54) METHODS AND SYSTEMS FOR AUTHENTICATING A HEADSET FOR A TRANSPORTATION VEHICLE

(71) Applicant: Panasonic Avionics Corporation, Lake Forest, CA (US)

(72) Inventor: Philip Watson, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 221 days.

(21) Appl. No.: 15/218,889

(22) Filed: Jul. 25, 2016

(65) Prior Publication Data

US 2018/0025149 A1    Jan. 25, 2018

(51) Int. Cl.
*G06F 21/44* (2013.01)
*B60R 16/037* (2006.01)
*B64D 11/00* (2006.01)
*H04L 9/32* (2006.01)

(52) U.S. Cl.
CPC ............ *G06F 21/44* (2013.01); *B60R 16/037* (2013.01); *B64D 11/0015* (2013.01); *H04L 9/3242* (2013.01); *H04L 9/3271* (2013.01); *G06F 2221/2129* (2013.01); *H04L 2209/84* (2013.01)

(58) Field of Classification Search
CPC . G06F 21/30; G06F 21/44; H04L 9/32; H04L 9/3226; H04L 9/3236; H04L 9/3242; H04L 9/3271
See application file for complete search history.

(56) References Cited

U.S. PATENT DOCUMENTS

| | | | |
|---|---|---|---|
| 8,412,857 B2 | 4/2013 | Ady et al. | |
| 8,667,303 B2 | 3/2014 | Nasir et al. | |
| 9,224,359 B2 | 12/2015 | Bourque | |
| 2005/0094822 A1* | 5/2005 | Swartz | A61B 5/121 381/56 |
| 2005/0251589 A1 | 11/2005 | Wang | |
| 2007/0083939 A1 | 4/2007 | Fruhauf et al. | |
| 2008/0313259 A1* | 12/2008 | Correa | G06Q 10/06375 709/201 |
| 2010/0182977 A1* | 7/2010 | Watanabe | H04N 5/4401 370/331 |
| 2010/0225176 A1* | 9/2010 | Bhargava | H04M 1/72527 307/125 |

(Continued)

FOREIGN PATENT DOCUMENTS

WO    WO2012/071133    5/2012
WO    WO2016/040920    3/2016

OTHER PUBLICATIONS

"USB On-The-Go", Wikipedia, https://en.wikipedia.org/w/index.php?title=USB_On-The-Go&oldid=723466456, Jun. 3, 2016.

*Primary Examiner* — Khang Do
(74) *Attorney, Agent, or Firm* — Brian Furrer

(57) ABSTRACT

Methods and systems for a transportation vehicle are provided. For example, one method includes storing a key on a device of a transportation vehicle and a headset; generating a challenge by the device using the key when the headset is connected to the device; presenting the challenge to the headset by the device; creating a response to the challenge by the headset; presenting the response to the device; validating the response by the device; and enabling a data line for the headset by the device when the response is valid.

20 Claims, 6 Drawing Sheets

(56) References Cited

U.S. PATENT DOCUMENTS

| | | | |
|---|---|---|---|
| 2012/0131353 A1* | 5/2012 | Nasir | G06F 21/42 |
| | | | 713/189 |
| 2014/0029770 A1* | 1/2014 | Chien | H04R 3/00 |
| | | | 381/123 |
| 2014/0126755 A1* | 5/2014 | Strasberg | H04R 1/1041 |
| | | | 381/309 |
| 2016/0072787 A1* | 3/2016 | Balabine | H04L 63/08 |
| | | | 726/6 |
| 2017/0063853 A1* | 3/2017 | Lim | H04L 9/0861 |
| 2017/0230365 A1* | 8/2017 | Poete | H04L 63/0876 |
| 2017/0331817 A1* | 11/2017 | Votaw | H04L 63/0838 |
| 2017/0357474 A1* | 12/2017 | Ferris | G06F 3/165 |

* cited by examiner

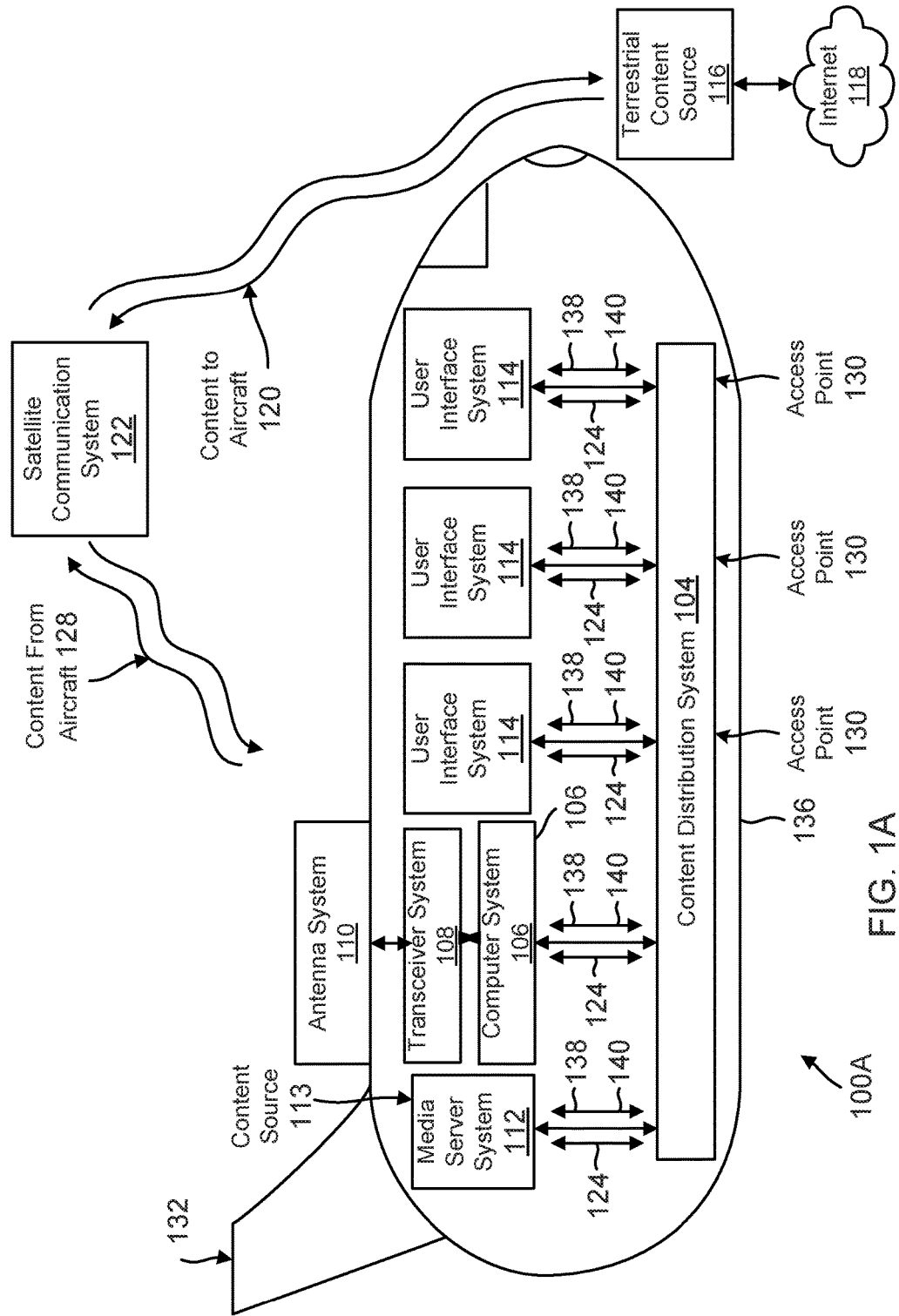

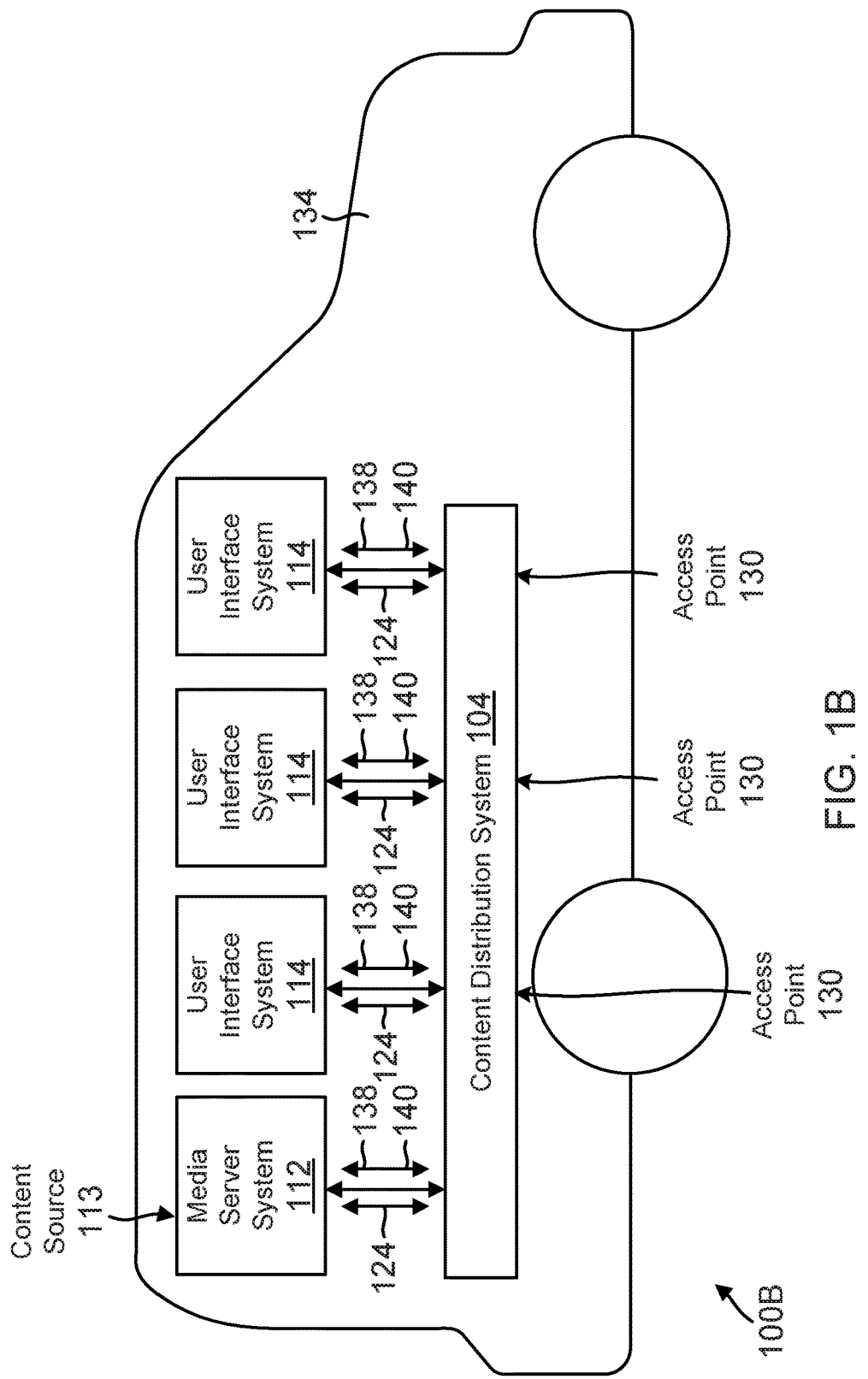

METHODS AND SYSTEMS FOR AUTHENTICATING A HEADSET FOR A TRANSPORTATION VEHICLE

TECHNICAL FIELD

The present disclosure relates to authenticating use of a headset for a transportation vehicle.

BACKGROUND

Transportation vehicles, for example, aircraft, trains, buses, recreation vehicle, boats and other similar vehicles use various computing devices for providing many functions, including conducting commercial transactions for goods/services, accessing and playing entertainment content and others. These devices include hardware (for example, servers, switches, network interface cards, storage adapters, storage devices and others) and software (for example, server applications, operating systems, firmware, management applications, application programming interface (APIs) and others).

Universal Serial Bus (USB) ports are commonly used for connecting peripheral devices using USB cables. USB is an industry standard that defines cables, connectors and communications protocols for a bus for connection, communication, and power supply between computers and various electronic devices. USB ports provide a connection for peripherals (including smart phones, video game consoles, PDAs, keyboards, pointing devices, digital cameras, printers, portable media players, disk drives and network adapters) to computing devices, both to communicate and to supply electric power.

USB ports may have security vulnerabilities and are often turned off in secured environments, for example, on an aircraft. In some instances, the USB ports on an aircraft are disabled for data transfer but may be used for charging devices. Continuous efforts are being made to securely and efficiently use USB ports in secured environments.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 1A shows an example of an operating environment for implementing the various aspects of the present disclosure in an aircraft;

FIG. 1B shows an example of the operating environment on another transportation vehicle type, according to one aspect of the present disclosure;

DETAILED DESCRIPTION

Figure 2:
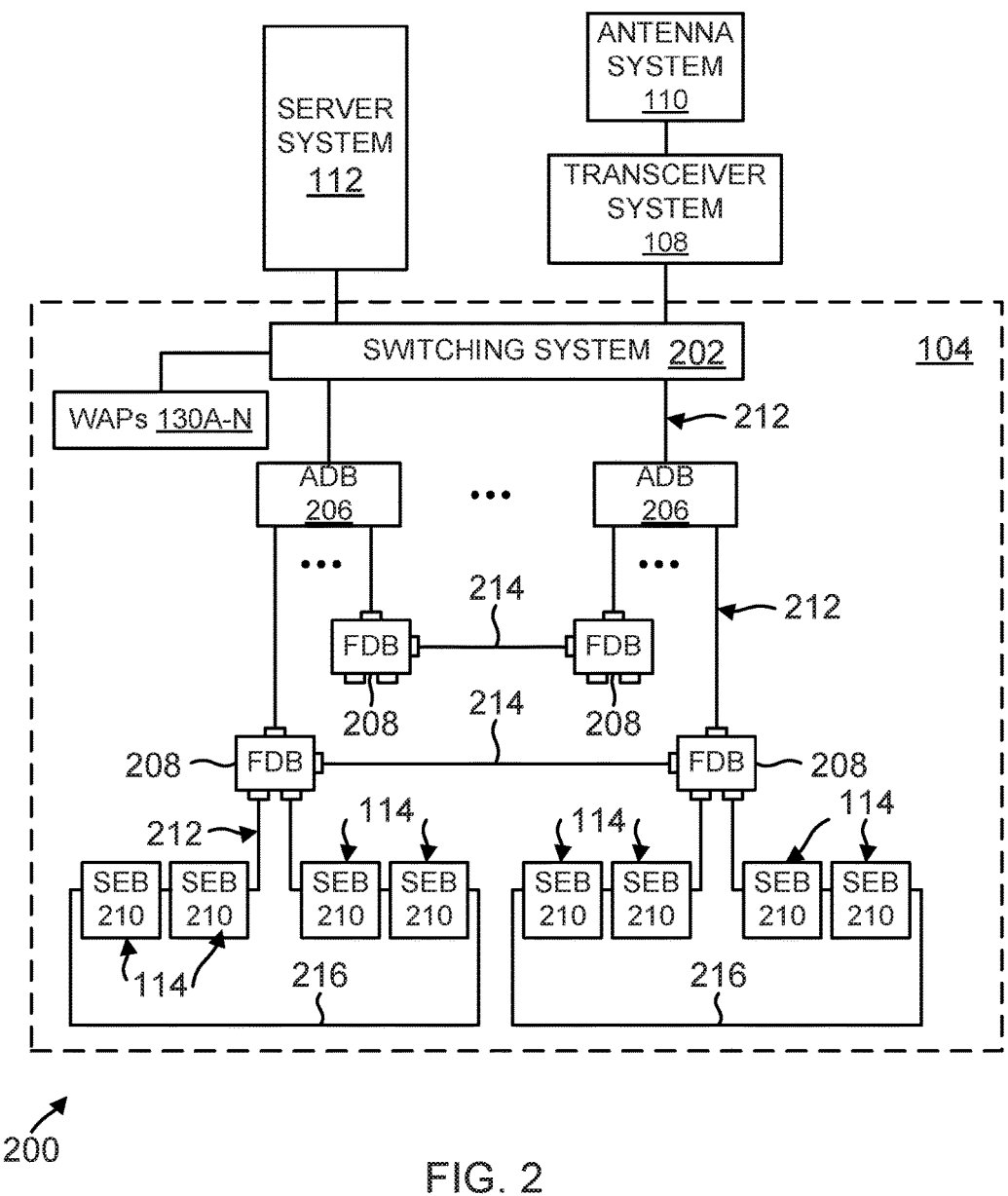
FIG. 2 shows an example of a content distribution system, used according to one aspect of the present disclosure.

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, methods and systems for a transportation vehicle are provided. For example, one method includes storing a shared key at a device of a transportation vehicle and a headset; generating a challenge by the device using the shared key when the headset is connected to the device; presenting the challenge to the headset by the device; creating a response to the challenge by the headset; presenting the response to the device; validating the response by the device; and enabling a data line for the headset by the device, when the response is valid.

In another aspect, a method for authenticating a headset on an aircraft is provided. The method includes generating a challenge by a seat device of the aircraft using a shared key after the headset is connected to a USB port; creating a response to the challenge by the headset using the shared key; validating the response by the seat device; and enabling a data line for the headset by the seat device, when the response from the headset is valid.

Vehicle Information System:

FIG. 1A shows an example of a generic vehicle information system 100A (also referred to as system 100A) that can be configured for installation aboard an aircraft 132 providing a USB port for power as well as for data, according to one aspect of the present disclosure. The system authenticates an audio headset before enabling the headset to access audio content, as described below in detail.

As an example, system 100A can comprise a conventional aircraft passenger in-flight entertainment (IFE) system, such as the Series 2000, 3000, eFX, eX1, eX2, eX3, eXW, eXO and/or any other in-flight entertainment system developed and provided by Panasonic Avionics Corporation (without derogation of any trademark rights of Panasonic Avionics Corporation) of Lake Forest, Calif.

System 100A may include a content source 113 and one or more user (or passenger) interface systems (may also be referred to as a seatback device) 114 that communicate with a real-time content distribution system 104. The content source 113 may include one or more internal content sources, such as a media server system 112, that are installed aboard the aircraft 132, one or more remote (or terrestrial)

content sources 116 that can be external from the aircraft 132, or a distributed content system. The media server system 112 can be provided as an information system controller for providing overall system control functions for system 100A and/or for storing viewing content 124. The viewing content 124 may include pre-programmed viewing content and/or any content 120 received via a satellite communication system 122, as desired. The viewing content 124 can include television programming content, music content, podcast content, photograph album content, audiobook content, and/or movie content without limitation. The viewing content 124 as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or other forms of non-volatile memory (NVM), or a hard disk drive (HDD) system, of any suitable kind, for storing the preprogrammed content and/or the viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include a public announcement and two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive content 120 from a selected terrestrial content source 116 via satellite communication system 122 and/or transmit content 128 to the satellite communication system 122, including navigation and other control instructions, to the terrestrial content source 116.

As desired, the terrestrial content source 116 can be configured to communicate with other terrestrial content sources (not shown). Although shown and described as comprising the satellite communication system 122 for purposes of illustration, the communication system can comprise any conventional type of wireless communication system, such as a cellular communication system (not shown) and/or other aircraft to off-board communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive content 120 from the terrestrial content source 116 and provide the received content 120 as viewing content 124, as processed by the transceiver system 108, to a computer system 106 of system 100A. The computer system 106 can provide the received content 120 to the media (or content) server system 112 and/or directly to one or more of the user interfaces 114, as desired. Although shown and described as being separate systems for purposes of illustration, the computer system 106 and the media server system 112 can be at least partially or fully integrated.

The user interface system 114 may be computing terminals in communication with an access point 130. The user interface system 114 provides a display device, for example, a smart monitor, to view content. The user interface system 114 includes a hardware interface to connect to an access point 130 that provides a wired and/or a wireless connection for the user interface system. In at least one embodiment, the user interface system (also referred to as a seatback device) 114 comprises a software application that a user downloads and installs on a personal user device carried aboard by a user (a personal electronic device or "PED") to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, for a Wi-Fi session, ordering food/beverages, shopping or for any other reason, payment information can be obtained using a seat device and/or a PED. In one aspect, the user interface system 114 is provided at individual passenger seats of aircraft 132. The user interface system 114 can be adapted to different aircrafts and seating arrangements.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN), of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANS), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 may also include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3:
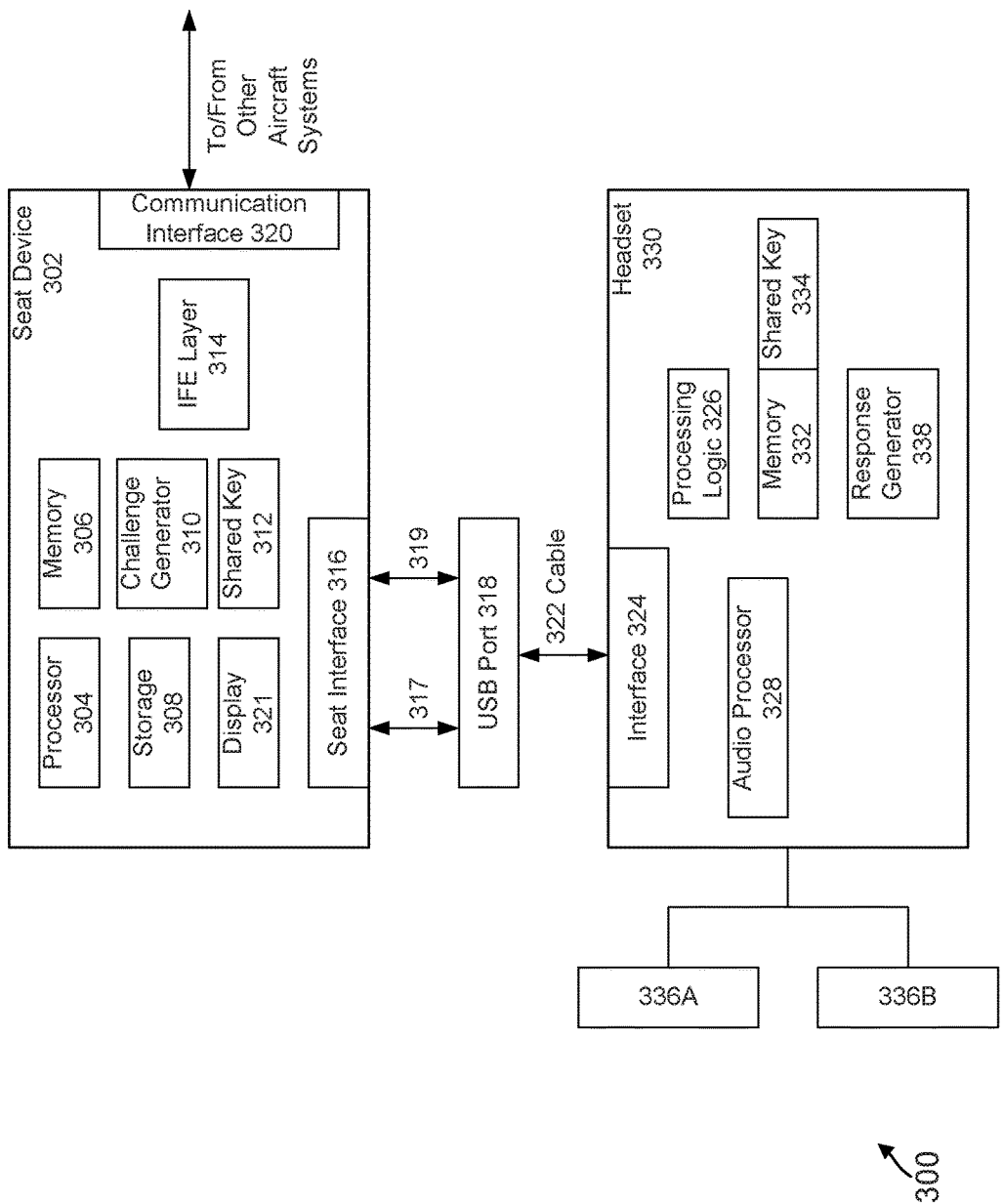
FIG. 3 shows an example of a system for authenticating a headset, according to one aspect of the present disclosure.

Headset Authentication System:

FIG. 3 shows an example of a system 300 for authenticating a headset 330 at a transportation vehicle, for example, an aircraft, using a USB port 318 that is conventionally disabled for data, according to one aspect of the present disclosure. System 300 shows a seat device 302 that is available at a passenger seat that presents audio/video content. Seat device 302 may be positioned in front of the passenger seat, coupled to the chair or placed in a manner that enables the passenger to view content at the seat device. The various aspects of the present disclosure are not limited to any specific orientation of the seat device 302.

Seat device 302 includes a communication interface 320 that communicates with other systems (for example, media server 112, computer system 106 and other devices, for example, PEDs and/or crew devices). Seat device 302 also includes a display 321 that displays content to a user. In one aspect, display 321 may operate as a touch screen to receive user input directly at the seat device 302.

Seat device 302 may include one or more processors 304 having access to a memory 306 and storage 308. The processor 304 controls the overall operation of the seat device 302. In certain aspects, processor 304 accomplishes this by executing software instructions out of memory 306.

Processor 304 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Memory 306 represents any form of random access memory (RAM), read-only memory (ROM), flash memory, or the like, or a combination of such devices. Storage device 308 may be, or may include any conventional medium for storing data in a non-volatile manner, such as one or more solid state devices, magnetic or optical based disks or any other type of storage.

In one aspect, seat device 302 executes a process or IFE layer 314 for providing audio/video content. In one aspect, the IFE layer 314 or a portion thereof may also be executed on an onboard computing system, for example, the media server system 112.

The seat device 302 may also execute a challenge generator 310 that uses a shared key 312 to generate a challenge for a headset that is connected using the USB port 318. The key, sometimes referred to as a pre-shared key (PSK), may be a password, pass phrase, hexadecimal string, or other type of string. In one aspect, the challenge generator 310 may be executed at the media server system 112 or an authorized PED that is paired or associated with the seat device 302 and/or the media server system 112. The adaptive aspects of the present disclosure are not limited to any specific location from where the challenge generator 310 is executed.

The USB port includes a power line 317 that is typically enabled for charging when a device is connected. The data line 319 is enabled upon the inventive authentication described herein.

In one aspect, the headset 330 is coupled to the USB port 318 using a USB cable 322. The form factor used by the cable 322 or the USB port 318 may conform to any variation of the USB standard. In general, there are three basic formats of USB connectors: the default or standard format intended for desktop or portable equipment (for example, on USB flash drives), the mini intended for mobile equipment and the thinner micro size, for low-profile mobile equipment. The various adaptive aspects described herein are not limited to any specific connector type or version of USB, for example, USB 1.0, USB 2.0, USB 3.0, USB 3.1 and/or USB on the go.

Headset 330 includes an interface 324 that receives cable 322. Headset 330 also includes processing logic 326 that has access to a memory 332 that may be a read only memory or any other memory type. Memory 332 stores the shared key 334 which is similar to the shared key 312 or a copy thereof. The processing logic 326 executes a response generator 338 that uses the shared key 334 to generate a response to a challenge received from the challenge generator 310, as described below in detail.

When headset 330 is plugged into the USB port 318, power line 317 is enabled immediately. The challenge generator 310 then computes a challenge using the shared key 312. The challenge may be a 256-bit challenge.

The headset 330 receives the challenge via interface 324. The response generator 338 uses the shared key 334 (which is the shared key 312) to generate a hash value. In one aspect, the response generator 338 uses a keyed-hash message authentication code (HMAC) technique involving a cryptographic hash function using the shared key 334 to generate the response. Any cryptographic hash function, for example, MD5, SHA-1 or any other type, may be used in the calculation of an HMAC. The cryptographic strength of the HMAC depends upon the cryptographic strength of the underlying hash function, the size of its hash output, and on the size and quality of the key. The response is provided to the seat device 302. The response is then verified by the challenge generator 310.

In another aspect, AES 256 or asymmetric encryption technique with a digital signature may be used to authenticate the headset 330. The various aspects described herein are not limited to any specific authentication technique.

Once the response from the headset 330 is validated, the data line 319 is enabled for receiving further communications from the headset, such as audio content. The audio content is processed by an audio processor 328 and presented to ear piece 336A/336B. In one aspect, when headset 330 has only one ear piece, then the audio is provided to the single ear piece. The adaptive aspects described herein are not limited to any specific number of ear pieces. Otherwise, if the headset 330 is not validated, further communications from the headset 330 are disabled. This permits the headset to 330 to operate as a passive audio device, without further security risk in receiving data from a suspect device. This advantageously permits a user that does not have a proper headset 330 to continue hearing audio, albeit without the benefit of the audio being processed by the audio processor 328, while maintaining an adequate level of security.

Figure 4:
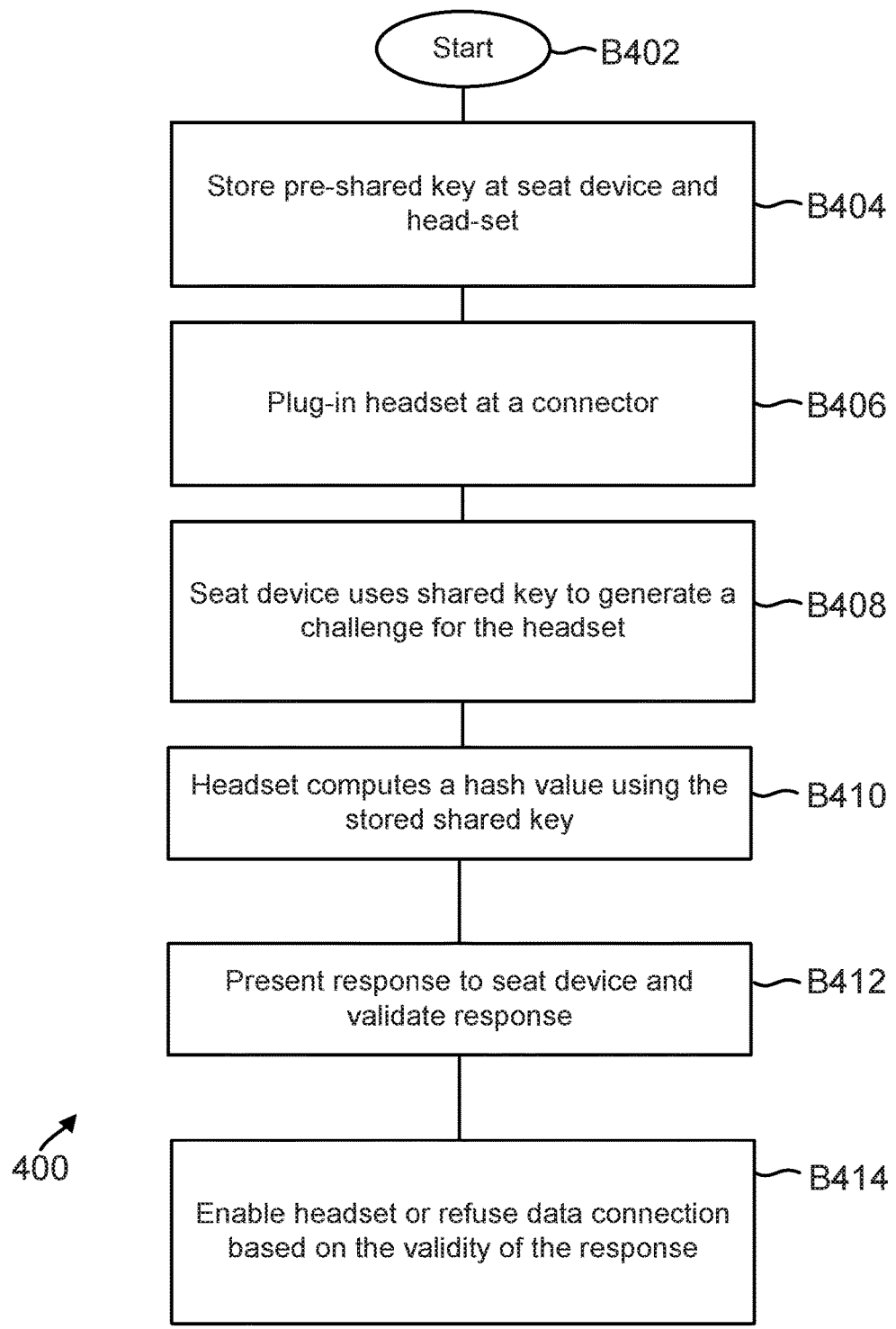
FIG. 4 shows an authentication process flow, according to one aspect of the present disclosure.

Process Flow:

FIG. 4 shows a headset authentication process 400, according to one aspect of the present disclosure. The process begins in block B402, when the headset 330 and seat device 302 are being configured. In one aspect, the configuration process is executed by a management console executing a management application (not shown). In block B404, a pre-shared key is stored at both the seat device 302 and the headset 330, for example, 312 and 334 shown in FIG. 3. Once the keys are stored, the headset is ready for use on the aircraft (or any other transportation vehicle).

In block B406, the headset 330 is plugged into the USB port 318 using cable 322. The power line 317 is enabled for charging immediately, without authentication. In block B408, seat device 302 uses the shared key 312 to generate a challenge for the headset 330. In one aspect, the challenge generator 310 generates a challenge using an encryption technique, for example, 256-bit challenge, AES256 encryption or asymmetric encryption.

In block B410, the response generator 338 of the headset 330 computes a hash value using the shared key 334. The response is presented to the seat device 302 in block B412. The challenge generator 310 then verifies if the response is valid, using the shared key 312. When the response is valid, then in block B414, the data line 319 is enabled, otherwise, further communications from the headset 330 are disabled. This permits the headset 330 to continue to operate as a passive audio device, without further security risk in receiving any data from a suspect device. This advantageously permits a user to hear audio, albeit without the benefit of audio processing.

The various aspects of the present disclosure, enable the use of a headset using secure authentication at a transportation vehicle. This allows a passenger to use the USB port at the transportation vehicle without compromising the security of the vehicle.

Figure 5:
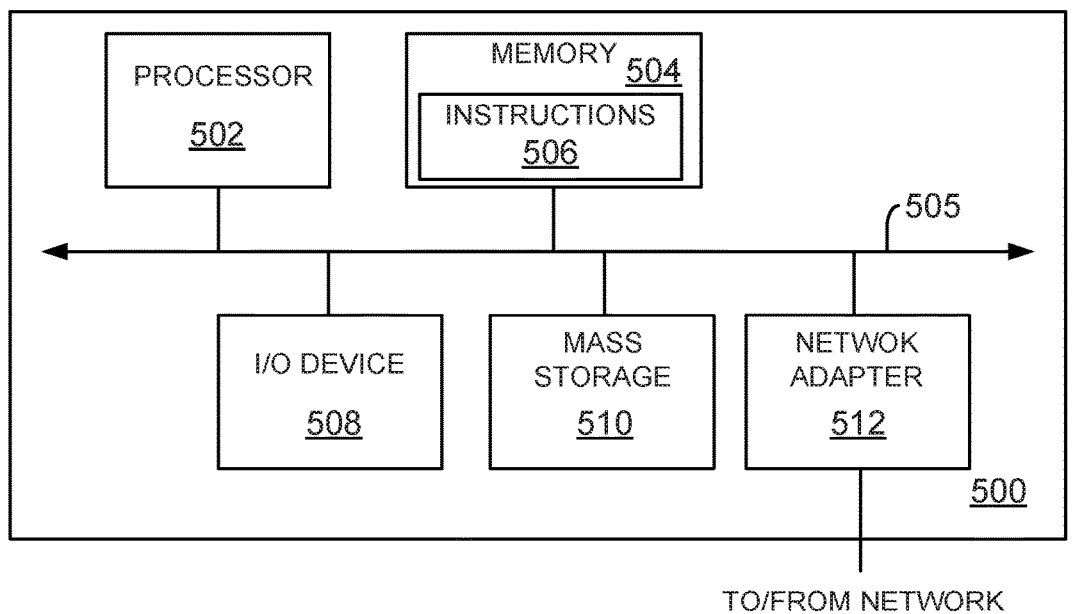
FIG. 5 shows an example of a hardware based, processing system, used according to one aspect of the present disclosure.

Processing System:

FIG. 5 is a high-level block diagram showing an example of the architecture of a processing system 500 that may be used according to one aspect. The processing system 500 can represent seat device 302, computing systems 106 and/or 112, user system 114 or any other device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the challenge generator 310/response generator 338 and process steps of FIG. 4 described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic, optical, or semiconductor based disks.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc.

A method and apparatus for authenticating a headset using a USB port on a transportation vehicle have been described in the foregoing paragraphs. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, the method comprising:
   storing a shared key on a device of a transportation vehicle and on a headset;
   generating a challenge for the handset by the device, using the shared key after the headset is connected to the device;
   presenting the challenge to the headset by the device;
   creating a response to the challenge by the headset using the shared key;
   presenting the response to the device;
   determining using the shared key by the device whether the response is valid or invalid;
   enabling further communications from the headset to the device, and the device to the headset, when the response is valid;
   when the response is invalid, disabling further communication from the headset to the device, while the headset continues to receive audio from the device to operate only as a passive audio listening device; and
   disabling by the device, a data line for the headset for receiving communication from the headset, after the headset is disconnected from the device.

2. The method of claim 1, wherein when the response is valid, the data line between the device and the headset is enabled for sending and receiving communication.

3. The method of claim 1, wherein a power line to power the headset is enabled before the headset is authenticated by the device.

4. The method of claim 1, wherein the challenge is generated by a management server using the shared key, the management server communicating with the device.

5. The method of claim 1, wherein the challenge is generated by a personal electronic device using the shared key, the personal electronic device paired with the device.

6. The method of claim 1, wherein the transportation vehicle is an aircraft.

7. The method of claim 6, wherein the device is a seat device at the aircraft for at least presenting audio content.

8. The method of claim 1, wherein the headset is connected to a universal serial bus (USB) port having the data line that is disabled by default, prior to authentication of the headset.

9. A machine implemented method for authenticating a headset on an aircraft, the method comprising:
   generating a challenge by a seat device of the aircraft using a shared key after the headset is connected to a universal serial bus (USB) port and powered by a power line prior to being authenticated;
   creating a response to the challenge by the headset using the shared key;
   determining using the shared key by the seat device, whether the response is valid or invalid;
   enabling further communications from the headset to the seat device and the seat device to the headset, when the response is valid; and
   when the response is invalid, disabling further communications from the headset to the seat device while the headset continues to receive audio from the from the seat device to operate only as a passive audio listening device; and
   disabling by the seat device, a data line for the headset for receiving communication from the headset, after the headset is disconnected from the seat device.

10. The method of claim 9, wherein the challenge is generated by a management server of the aircraft using the shared key, the management server communicating with the seat device.

11. The method of claim 9, wherein the challenge is generated by a personal electronic device using the shared key, the personal electronic device paired to the seat device.

12. The method of claim 9, wherein an error message is generated by the seat device when the response is invalid.

13. A system comprising:
   a device of a transportation vehicle including a memory containing machine readable medium comprising machine executable code and a key; a processor module coupled to the memory, the processor module configured to execute the machine executable code to generate a challenge by the device using the key, and a port including a data line that is disabled by default; and
   a headset including processing logic, memory storing another the key, a challenge generator executable by the processing logic using the key, and a cable extending therefrom, the cable having a terminal insertable into the port;

wherein when the terminal is plugged into the port of the device, the machine executable code of the device generates the challenge and presents the challenge to the headset, the processing logic of the headset creates a response to the challenge using the key in the memory of the headset and presents the response to the device, and the machine executable code of the device determines if the response is valid, and if the response is valid, enables further communication from the headset to the device, and the device to the headset; otherwise, if the response is invalid, disables further communication from the headset to the device, while the headset continues to receive audio from the device to operate as a passive audio listening device;

wherein when the terminal is removed from the port, the machine executable code of the device disables the data line to prevent unauthenticated communication from the headset.

14. The system of claim 13, wherein the port is a universal serial bus (USB) port having the data line that is disabled by default.

15. The system of claim 13, wherein the port includes a power line that is maintained in an enabled state to power the headset, prior to authentication of the headset.

16. The system of claim 13, wherein the challenge is generated by a management server using the key, the management server interfacing with the device.

17. The system of claim 13, wherein the challenge is generated by a personal electronic device using the key, the personal electronic device paired with the device.

18. The system of claim 13, wherein the transportation vehicle is an aircraft.

19. The system of claim 18, wherein the device is a seat device at the aircraft for at least presenting audio content.

20. The system of claim 13, wherein the transportation vehicle is one of a train, a bus, a boat and a recreation vehicle.

* * * * *